United States Patent
Loescher et al.

(10) Patent No.: US 10,259,258 B2
(45) Date of Patent: Apr. 16, 2019

(54) ADHESIVE FILM AND METHOD OF MAKING A GRAPHIC

(71) Applicant: 3M INNOVATIVE PROPERTIES COMPANY, St. Paul, MN (US)

(72) Inventors: Claus W. Loescher, Neuss (DE); Viktor Dannewitz, Langenfeld (DE); Kirstin Krybus, Hilden (DE); Dirk Kolowrot, Duesseldorf (DE)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 1065 days.

(21) Appl. No.: 13/714,657

(22) Filed: Dec. 14, 2012

(65) Prior Publication Data

US 2013/0153137 A1 Jun. 20, 2013

(30) Foreign Application Priority Data

| Dec. 15, 2011 | (EP) | ................................ | 11193671 |
| Dec. 15, 2011 | (EP) | ................................ | 11193673 |
| Dec. 15, 2011 | (EP) | ................................ | 11193677 |

(51) Int. Cl.

| *B44C 1/18* | (2006.01) |
| *B44C 1/10* | (2006.01) |
| *B32B 7/06* | (2006.01) |
| *C09J 7/00* | (2018.01) |
| *G09F 3/10* | (2006.01) |

(Continued)

(52) U.S. Cl.
CPC .................. *B44C 1/18* (2013.01); *B32B 7/06* (2013.01); *B44C 1/105* (2013.01); *C09J 7/245* (2018.01); *C09J 7/50* (2018.01); *G09F 3/10* (2013.01); *G09F 7/12* (2013.01); *C09J 2427/006* (2013.01); *C09J 2461/003* (2013.01); *C09J 2467/003* (2013.01); *Y10T 156/10* (2015.01); *Y10T 428/1424* (2015.01); *Y10T 428/1433* (2015.01)

(58) Field of Classification Search
CPC ..................................... C09J 7/245; C09J 7/50
USPC .............................................. 428/354, 423.1
See application file for complete search history.

(56) References Cited

U.S. PATENT DOCUMENTS

| 2,736,721 A | 4/1956 | Dexter |
| RE24,906 E | 12/1960 | Ulrich et al. |

(Continued)

FOREIGN PATENT DOCUMENTS

| DE | 32 20 886 | 12/1983 |
| EP | 1 179 577 | 2/2002 |

(Continued)

OTHER PUBLICATIONS

Handbook of Pressure-Sensitive Adhesives, Edited by D. Satas, 2$^{nd}$ edition, Von Nostrand Reinhold, N.Y. 1989.

(Continued)

*Primary Examiner* — Ramsey Zacharia
(74) *Attorney, Agent, or Firm* — Daniel J. Iden (57) ABSTRACT

The present application relates to an adhesive film comprising a polyvinyl chloride film having opposite first and second major sides. The first major side has an adhesive layer protected by a release liner and a primer layer arranged between the polyvinyl chloride film and the adhesive layer. The primer layer comprises an aminoplast and a polyester and/or a curing product.

27 Claims, 2 Drawing Sheets

(51) Int. Cl.
*G09F 7/12* (2006.01)
*C09J 7/50* (2018.01)
*C09J 7/24* (2018.01)

(56) References Cited

U.S. PATENT DOCUMENTS

| | | | |
|---|---|---|---|
| 4,101,496 A * | 7/1978 | Dorffel et al. | 524/539 |
| 4,181,752 A | 1/1980 | Martens et al. | |
| 4,418,120 A | 11/1983 | Kealy et al. | |
| 4,603,074 A | 7/1986 | Pate et al. | |
| 4,833,179 A | 5/1989 | Young et al. | |
| 4,968,562 A | 11/1990 | Delgado | |
| 4,994,322 A | 2/1991 | Delgado et al. | |
| 5,141,790 A | 8/1992 | Calhoun et al. | |
| 5,209,971 A | 5/1993 | Babu et al. | |
| 5,296,277 A | 3/1994 | Wilson et al. | |
| 5,362,516 A | 11/1994 | Wilson et al. | |
| 5,387,304 A | 2/1995 | Berner et al. | |
| 5,461,134 A | 10/1995 | Leir et al. | |
| 5,612,107 A * | 3/1997 | Sangani et al. | 428/41.7 |
| 5,954,907 A * | 9/1999 | LaRose et al. | 156/275.5 |
| 6,197,397 B1 | 3/2001 | Sher et al. | |
| 2003/0035972 A1 * | 2/2003 | Hanson et al. | 428/480 |
| 2005/0048213 A1 | 3/2005 | Callicott et al. | |
| 2005/0112324 A1 | 5/2005 | Rosenbaum et al. | |
| 2008/0299346 A1 | 12/2008 | Onderisin et al. | |

FOREIGN PATENT DOCUMENTS

| | | |
|---|---|---|
| JP | 11 296089 | 10/1999 |
| WO | WO 92/13924 | 8/1992 |
| WO | WO 93/12147 | 6/1993 |
| WO | WO 95/13331 | 5/1995 |
| WO | WO 00/14323 | 3/2000 |
| WO | WO 00/69985 | 11/2000 |

OTHER PUBLICATIONS

Encyclopedia of Polymer Science and Engineering, vol. 13, Wiley-Interscience Publishers, New York, 1988.
Encyclopedia of Polymer Science and Engineering, vol. 16, Wiley-Interscience Publishers, New York, 1964.

* cited by examiner

ADHESIVE FILM AND METHOD OF MAKING A GRAPHIC

BACKGROUND

The present invention relates to an adhesive film based on polyvinyl chloride (PVC) in particular for use in a method of making a decoration of graphi. In particular aspect, the invention relates to a method of applying a graphic to a substrate such as a building or a vehicle using a PVC based adhesive film.

PVC based adhesive films have been widely used in producing graphics or decorations on substrates. For example adhesive films are used to provide advertisement, logos or company names and information on vehicles such as vans, busses, trains, trams etc. They may also be used on buildings. Typically, the adhesive film will have to remain in place for an extended period of time up to several years. Accordingly, the graphics produced with the film are exposed to a large variety of weather conditions. Particularly in so called horizontal applications, where the film is applied over a generally horizontal surface such as on the hood of a car, the weathering conditions may be particularly severe. Accordingly, the adhesive film needs to have excellent weathering stability and excellent adhesion characteristics to the surface.

Yet, after use, it is generally desirable that the graphic film can be removed without damaging the surface of the substrate which frequently may be a painted surface. In certain applications, these graphics may be of a significant size. Adhesion of a large image graphic film to substrates encounters the problem of entrapped air between the film and the substrate. Anyone who has ever attempted to hang wallpaper can appreciate the frustration that can arise when entrapped air beneath an adhesive-backed film can not be removed easily. The removal of air bubbles is labor intensive. The art has provided multiple solutions to this problem by providing air-bleed channels in the adhesive. For example, EP 951518 discloses the use of channels in the adhesive to allow air bleed during application of the graphic film. In certain instances it has been found that the presence of air bleed channels may become visible on the graphic and disturb the appeal of the graphic. Such may occur shortly after application of the film or develop over an extended period of time.

Still further, the surface of the substrate may be uneven requiring good conformability of the film. For example, when the film is used in personalization of vehicles or in decorating vehicles, the film may need to be applied over recesses such as where the license plate is located, over curved surfaces such as over bumpers and/or other complex contours of the substrate. As a result of stress relaxation of the film following the application on the substrate, the adhesive film may lift and pop-up in areas where the surface of the substrate is uneven or has a complex shape. This undesired behavior may become apparent shortly after application or after some time.

Also, when applying the film over an uneven substrate with a complex shape, so called "whitening at stress" may occur leading to a more or less pronounced color change and/or change in gloss of the graphic film.

In certain methods for producing graphics, the PVC adhesive is cut in a plotter, so-called electro cutting whereby the film up to the liner protecting the adhesive is cut with a desired image, for example lettering. Following the electro-cutting, the adhesive film is weeded, whereby the undesired parts are removed from the liner, thereby leaving thereon the desired image, for example lettering. The parts removed present the negative of the image remaining on the liner. With the aid of an application tape, the image is then applied on the substrate on which the graphic is desired. To produce appealing graphics, a variety of graphic films is desired showing a wide range of colors with good vibrancy. Also, special effects films are desired producing a metallic or pearlescent look.

SUMMARY

It would now be desired to find an adhesive film for use in a method of producing a graphic of discrete graphic elements whereby the film can be readily applied to a substrate, including substrates having an uneven surface or complex shape. Accordingly, the film desirably has good conformability and limited tendency for lifting or popping-up. Desirably the film has good weathering stability. The film should be readily removable after use over an extended period of time without causing damage to the surface of the substrate. Further, the appealing look of the film does not substantially change over time and/or effects of gloss or color change induced by stretching of the film during application over complex substrates should be minimized.

In one aspect, the invention relates to an adhesive film comprising a polyvinyl chloride film having opposite first and second major sides, the first major side having an adhesive layer protected by a release liner and a primer layer arranged between the polyvinyl chloride film and the adhesive layer, the primer layer comprising an aminoplast and a polyester and/or a curing product thereof.

In another aspect, the invention relates to a method for making the above film, the method comprising (i) applying on a carrier web in the order given: the polyvinyl chloride film layer, primer layer, adhesive layer and release liner and (ii) removing the carrier web.

In yet another aspect, the invention relates to a method for producing a graphic on a substrate, the method comprising (i) providing an adhesive film as defined above, (ii) removing the release liner, and (iii) applying the adhesive film on the substrate.

Typically, the adhesive film used in the method is particularly suitable for application on substrates with a complex shape and/or uneven surface. In particular, the tendency of the film to lift or pop-up, in particular in areas that have sharp or sudden changes in the evenness of the surface (for example at recesses, rivets etc.) is limited. The film also shows good weathering stability and allows producing films of a large variety of vibrant colors as well as films with special effects.

The following is a summary of a first set of embodiments in connection with the present invention:

A1. Method of making a decoration comprising a plurality of discrete units of colored adhesive film, the colored adhesive film of each of the discrete units comprising a polyvinyl chloride film having on one major side thereof an adhesive layer protected by a release liner, wherein a primer layer is arranged between the polyvinyl chloride film and the adhesive layer, the primer layer comprising an aminoplast and a polyester and/or a curing product thereof, the method comprising:
(i) providing a colored graphics film comprising a polyvinyl chloride film comprising on a major side thereof said adhesive layer and said primer layer arranged between said adhesive layer and the polyvinylchloride film, the adhesive layer being protected by a release liner;
(ii) cutting the polyvinyl chloride film, the primer layer and the adhesive layer of the colored graphics film to define therein said plurality of discrete units,
(iii) delaminating the cut polyvinyl chloride film, the primer layer and the adhesive layer from the release liner of said colored graphics film so as to leave the plurality of discrete units on said release liner;
(iv) applying an adhesive application tape over the said plurality of discrete units;
(v) removing the release liner thereby leaving the plurality of discrete units attached to the adhesive application tape
(vi) applying the adhesive application tape with the plurality of discrete units to a surface to be decorated so as to sandwich the plurality of discrete units between the surface and the adhesive application tape; and
(vii) removing the application tape.

A2. Method according to embodiment A1 wherein the surface to be decorated is uneven and wherein the colored adhesive film is applied over the uneven surface conforming thereto.

A3. Method according to embodiment A1 or A2 wherein the surface to be decorated is the surface of a vehicle.

A4. Method according to embodiment A3 wherein the vehicle is a motor vehicle.

A5. Method according to embodiment A3 wherein the vehicle is a car, a bus, a train, a tram or an airplane.

A6. Method according to any of the previous embodiments wherein the polyvinyl chloride film is colored and/or the primer layer is colored.

A7. Method according to any of the previous embodiments wherein the primer layer comprises a white pigment.

A8. Method according to embodiment A7 wherein the white pigment comprises titanium dioxide.

A9. Method according to any of the previous embodiments wherein the aminoplast in the primer layer is an alkylated melamine formaldehyde resin.

A10. Method according to embodiment A9 wherein the aminoplast is an n-butylated melamine formaldehyde resin.

A11. Method according to any of the previous embodiments wherein the polyester in the primer layer is a urethane modified polyester.

A12. Method according to any of the previous embodiments wherein the curing product of the aminoplast and polyester is a condensation product.

A13. Method according to any of the previous embodiments wherein the weight ratio of polyester to aminoplast in the primer layer is between 70 and 2.

A14. Method according to any of the previous embodiments wherein the primer layer of the colored adhesive film has a thickness of more than 10 microns.

A15. Method according to any of the previous embodiments wherein the adhesive layer comprises a pressure sensitive adhesive.

A16. Method according to embodiment A15 wherein the pressure sensitive adhesive comprises an acrylic polymer.

A17. Method according to any of previous embodiments wherein the adhesive layer has a thickness of 10 to 50 micrometers.

A18. Method according to any of the previous embodiments wherein the release liner comprises on the major surface contacting the adhesive layer a series of ridges along at least two in-plane directions whereby the ridges are interconnected thereby defining a number of recesses enclosed by ridges, and wherein after removal of the release liner, a colored adhesive film is obtained having on one major side an adhesive layer having a surface topography that is an inverse topography of the release liner topography defined by the series of ridges.

A19. Method for making a colored adhesive film suitable for use in a method as defined in any of the previous embodiments, the method comprising (i) applying on a carrier web in the order given: the polyvinyl chloride film layer, primer layer, adhesive layer and release liner and (ii) removing the carrier web.

A20. Method according to embodiment A19 wherein the carrier web comprises a release layer and the polyvinyl chloride film layer is applied thereto by applying a polyvinyl chloride organosol composition, heating and drying the applied organosol.

A21. Method according to embodiment A19 or A20, wherein the primer layer is applied by applying on the polyvinyl chloride film a composition comprising an aminoplast and a polyester, heating and drying the applied composition.

A22. Method according to any of embodiments A19 to A21 wherein the adhesive layer and release liner are applied by laminating a laminate of adhesive layer and release liner to the primer layer.

The following is a summary of a second set of embodiments in connection with the present invention:

B1. Adhesive film comprising a polyvinyl chloride film having on one major side thereof an adhesive layer protected by a release liner, wherein a primer layer is arranged between the polyvinyl chloride film and the adhesive layer, the primer layer comprising an aminoplast and a polyester and/or a curing product thereof and wherein the release liner comprises on the major surface contacting the adhesive layer a series of ridges along at least two in-plane directions whereby the ridges are interconnected thereby defining a number of recesses enclosed by ridges.

B2. Adhesive film according to embodiment B1 wherein the release liner comprises a polyolefin coated paper.

B3. Adhesive film according to embodiments B1 or B2 wherein the ridges have an average height of not more than 30 microns.

B4. Adhesive film according to any of embodiments B1 to B3 wherein the average distance between two ridges in a series of ridges is between 50 and 400 microns when measured at the top of the ridges.

B5. Adhesive film according to any of the previous embodiments B wherein the aminoplast in the primer layer is an alkylated melamine formaldehyde resin.

B6. Adhesive film according to embodiment B5 wherein the aminoplast is an n-butylated melamine formaldehyde resin.

B7. Adhesive film according to any of the previous embodiments B wherein the polyester in the primer layer is a urethane extended polyester.

B8. Adhesive film according to any of the previous embodiments B wherein the curing product of the aminoplast and polyester is a condensation product of the aminoplast and polyester.

B9. Adhesive film according to any of the previous embodiments B wherein the primer layer is obtainable from a composition having a weight ratio of polyester to aminoplast between 70 and 2.
- B10. Adhesive film according to any of the previous embodiments B wherein the primer layer further comprises one or more white pigments.
- B11. Adhesive film according to embodiment B10 wherein the one or more white pigment comprises titanium dioxide.
- B12. Adhesive film according to any of the previous embodiments B wherein the primer layer comprises one or more coloring pigments.
- B13. Adhesive film according to any of the previous embodiments B wherein the primer layer has a thickness of 5 to 50 microns.
- B14. Adhesive film according to any of the previous embodiments B wherein the primer layer has a thickness of more than 10 microns.
- B15. Adhesive film according to any of the previous embodiments B wherein the adhesive layer comprises a pressure sensitive adhesive.
- B16. Adhesive film according to embodiment B15 wherein the pressure sensitive adhesive comprises an acrylic polymer.
- B17. Adhesive film according to any of the previous embodiments B wherein the polyvinyl chloride film is clear transparent and the primer layer comprises metallic particles.
- B18. Adhesive film according to any of embodiments B1 to B16 wherein the polyvinyl chloride film is a white or black colored film.
- B19. Adhesive film according to any of embodiments B1 to B16 wherein the polyvinyl chloride film comprises one or more color pigments and has a color other than white or black.
- B20. Adhesive film according to any of the previous embodiments B wherein the polyvinyl chloride film has a thickness of 25 to 100 microns.
- B21. Adhesive film according to embodiment B19 or B20 wherein the adhesive film comprises a clear transparent top layer on the major side of the polyvinyl chloride film opposite to the major side comprising the adhesive layer.
- B22. Adhesive film according to embodiment B21 wherein the transparent top layer comprises polyvinyl chloride.
- B23. Adhesive film according to embodiments B21 or B22 wherein the top layer has a thickness of 1 to 50 microns.
- B24. Method for producing a graphic on a substrate, the method comprising
  - (i) providing an adhesive film as defined in any of embodiments B1 to B23
  - (ii) removing the release liner thereby obtaining an adhesive film having on one major side an adhesive layer having a surface topography that is an inverse topography of the release liner topography defined by the series of ridges;
  - (iii) applying the adhesive film on the substrate.
- B25. Method according to embodiment B24 wherein the substrate comprises an uneven surface and wherein the adhesive film is applied over the uneven surface conforming thereto.
- B26. Method according to embodiment B25 wherein the uneven surfaces comprises a recess and wherein the adhesive film is conformed to the recess by applying the adhesive film over the recess so as to bridge the recess and pressing the film into the recess optionally while heating the adhesive film.
- B27. Method according to any of embodiments B24 to B26 wherein the substrate comprises a vehicle.
- B28. Method according to embodiment B27 wherein the vehicle is a car, a bus, a tram, a train or an airplane.

The following is a summary of a third set of embodiments in connection with the present invention:
- C1. Adhesive film comprising a colored polyvinyl chloride film having opposite first and second major sides, the first major side having an adhesive layer protected by a release liner and a primer layer arranged between the colored polyvinyl chloride film and the adhesive layer, the primer layer comprising an aminoplast and a polyester and/or a curing product thereof and having a thickness of more than 10 microns, the second major side having a clear transparent top layer.
- C2. Adhesive film according to embodiment C1 wherein the release liner comprises on the major surface contacting the adhesive layer a series of ridges along at least two in-plane directions whereby the ridges are interconnected thereby defining a number of recesses enclosed by ridges.
- C3. Adhesive film according to embodiments C1 or C2 wherein the release liner comprises a polyolefin coated paper.
- C4. Adhesive film according to embodiments C2 or C3 wherein the ridges have an average height of not more than 30 microns.
- C5. Adhesive film according to any of embodiments C2 to C4 wherein the average distance between two ridges in a series of ridges is between 50 and 400 microns when measured at the top of the ridges.
- C6. Adhesive film according to any of the previous embodiments C wherein the aminoplast in the primer layer is an alkylated melamine formaldehyde resin.
- C7. Adhesive film according to embodiment C6 wherein the aminoplast is an n-butylated melamine formaldehyde resin.
- C8. Adhesive film according to any of the previous embodiments C wherein the polyester in the primer layer is a urethane extended polyester.
- C9. Adhesive film according to any of the previous embodiments C wherein the curing product of the aminoplast and polyester is a condensation product of the aminoplast and polyester.
- C10. Adhesive film according to any of the previous embodiments C wherein the weight ratio of polyester to aminoplast in the primer layer is between 70 and 2.
- C11. Adhesive film according to any of the previous embodiments C wherein the primer layer further comprises one or more white pigments.
- C12. Adhesive film according to embodiment C11 wherein the one or more white pigments comprise titanium dioxide.
- C13. Adhesive film according to any of the previous embodiments C wherein the primer layer has a thickness of at least 15 microns.
- C14. Adhesive film according to any of the previous embodiments C wherein the adhesive layer comprises a pressure sensitive adhesive.
- C15. Adhesive film according to embodiment C14 wherein the pressure sensitive adhesive comprises an acrylic polymer.
- C16. Adhesive film according to any of the previous embodiments C wherein the adhesive layer has a thickness of 10 to 50 micrometer.

C17. Adhesive film according to any of embodiments C1 to C16 wherein the polyvinyl chloride film comprises one or more color pigments and has a color other than white or black.

C18. Adhesive film according to any of the previous embodiments C wherein the polyvinyl chloride film has a thickness of 25 to 100 micrometer.

C19. Adhesive film according to any of the previous embodiments C wherein the clear transparent top layer comprises polyvinyl chloride.

C20. Adhesive film according to embodiment C19 wherein the top layer has a thickness of 1 to 50 micrometer.

C21. Method for producing a graphic on a substrate, the method comprising
(iv) providing an adhesive film as defined in any of embodiments C1 to C20
(v) removing the release liner,
(vi) applying the adhesive film on the substrate.

C22. Method according to embodiment C21 wherein the substrate comprises an uneven surface and wherein the adhesive film is applied over the uneven surface conforming thereto.

C23. Method according to any of embodiments C21 to C22 wherein the substrate comprises a vehicle.

C24. Method according to embodiment C23 wherein the vehicle is a car, a bus, a tram, a train or an airplane.

BRIEF DESCRIPTION OF THE DRAWINGS

In connection with the present invention, reference may be made to the following drawings which are schematic and are for illustrative purpose only.

DETAILED DESCRIPTION

PVC Film

The polyvinyl chloride film is typically a plasticized PVC. The PVC film may be clear transparent or may be colored. In one particular embodiment, the adhesive film is white and at least the polyvinyl chloride film is colored white and/or the primer layer is colored white. White pigments that may be used include titanium dioxide or zinc oxide. In another embodiment, the adhesive film is black and at least the PVC film and/or the primer layer are colored black. Suitable pigments for coloring the PVC film and/or primer layer black include carbon blacks. In yet a further embodiment, an adhesive film having a metallic look, including a colored metallic look, is provided. A metallic look adhesive film may be provided by a primer layer comprising metal particles such as aluminum flakes. The PVC film will typically be clear transparent for metallic looking adhesive films. Further, where in addition to the metallic effect a color effect, for example a color other than black or white, is desired a color pigment may typically be added to the primer layer. In a further embodiment, a colored adhesive film, having a color other than white or black may be provided by adding color pigments to the PVC film. In such cases, it will typically be advantageous to add a white pigment to the primer layer in case of light colors and a black pigment to the primer layer for darker colors.

The thickness of the PVC film may vary widely but typically is at least 20 microns. In a particular embodiment, the PVC film may have a thickness of 25 to 100 microns. In another embodiment, the thickness may be from 30 microns to 80 microns or from 30 microns to 60 microns.

As mentioned above, the PVC film may include color pigments such as white pigments, black pigments and/or color pigments other than black and white. Where the PVC film includes color pigments, they can be comprised in the PVC film in an amount of 1 to 100 parts per 100 parts by weight of PVC. The PVC film may include further optional components such as plasticizers, UV stabilizers, heat stabilizers, acrylic resins, polyesters, surfactants and rheology modifiers.

Primer Layer

The primer layer comprises a polyester and an aminoplast. In a particular embodiment, the primer layer may include a curing product of the polyester and aminoplast. Suitable polyesters may be based for example on a condensation reaction between a linear aliphatic, branched aliphatic and/or cyclo-aliphatic polyol and an aliphatic, cyclo-aliphatic and/or aromatic poly carboxylic acid or its anhydride. The ratio of polyol and acids or anhydrides is typically selected such that there is an excess of acid or anhydride over alcohol (so as) to form a polyester which has free carboxylic groups or anhydride groups.

The polyester may comprise units of for example isophthalic acid, terephthalic acid, 2,6-naphthalene dicarboxylic acid, 4,4'-oxybisbenzoic acid, 3,6-dichloro phthalic acid, tetrachloro phthalic acid, tetrahydro phthalic acid, trimellitic acid, pyromellitic acid, hexahydro terephthalic acid (cyclohexane dicarboxylic acid), hexachloro endomethylene tetrahydro phthalic acid, phthalic acid, azelaic acid, sebacic acid, decane dicarboxylic acid, adipic acid, succinic acid, maleic acid and/or fumaric acid. These acids may be used as such, or, in so far as available as their anhydrides, acid chlorides or lower alkyl esters. In a particular embodiment, the polyester comprises at least isophthalic acid units and/or terephthalic acid units.

The polyester may also comprise other carboxylic acid units in amounts of up to for example 25 mol % of the total amount of carboxylic acids. Also trifunctional or higher functional acid units may be present, such as for example trimellitic acid or pyromellitic acid. These tri or higher functional acids may be used to obtain branched polyesters or used as end groups of the polyester. Hydroxy carboxylic acids and/or optionally lactones may also be used, for example, 12-hydroxy stearic acid, hydroxy pivalic acid and/or .epsilon.-caprolactone. Also monocarboxylic acids such as for example benzoic acid, tert.-butyl benzoic acid, hexahydro benzoic acid and/or saturated aliphatic monocarboxylic acids may be applied.

Useful polyalcohols, in particular diols, reactable with the carboxylic acids to obtain the polyester include aliphatic diols. Suitable examples include ethylene glycol, propane-1,2-diol, propane-1,3-diol, butane-1,2-diol, butane-1,4-diol, butane-1,3-diol, 2,2-dimethylpropanediol-1,3 (=neopentyl glycol), hexane-2,5-diol, hexane-1,6-diol, 2,2-bis-(4-hydroxy-cyclohexyl)-propane (hydrogenated bisphenol-A), 1,4-dimethylolcyclohexane, diethylene glycol, dipropylene glycol, 2,2-bis[4-(2-hydroxy ethoxy)-phenyl]propane, the hydroxy pivalic ester of neopentyl glycol, 2-ethyl, 2-butyl propanediol-1,3 (=butylethylpropane diol), 2-ethyl, 2-methyl propanediol-1,3 (=ethylmethylpropane diol) and/or 2-methylpropanediol-1,3 (MP-Diol). Tri- or higher functional alcohols may be used in small amounts in order to obtain branched polyesters. Examples of suitable polyols include glycerol, hexanetriol, trimethylol ethane, trimethylol propane tris-(2-hydroxyethyl)-isocyanurate, pentaerythritol and/or sorbitol.

The polyester may be prepared according to conventional procedures by esterification or transesterification, optionally in the presence of customary esterification catalysts for example dibutyltin oxide or tetrabutyl titanate. The preparation conditions and the COOH/OH ratio may be selected so as to obtain end products that have an acid number and/or a hydroxyl number as may be desired. Typically, the polyester may have a hydroxyl number of at least 5, for example between 5 and 50 mg KOH/gram polyester.

The number average molecular weight (Mn) of the polymer (a) may be for example between about 1,000 and about 8,000. Preferably the number average molecular weight (Mn) of the polymer (a) ranges between about 1,400 and 7,500.

The polyester may be a crystalline, semi-crystalline or amorphous solid at room temperature. In case the polymer is crystalline, it has a melting temperature Tm, in case it is semi-crystalline it has a melting temperature Tm and a glass transition temperature Tg, in case it is amorphous, it has a glass transition temperature Tg.

In a particular embodiment, the polyester may be modified to include further functionality. For example, in a particular embodiment, the polyester may be modified or include groups capable of reacting with the aminoplast such as for example epoxy groups. In another embodiment, the polyester may be modified with a urethane group such as a urethane extended polyester.

Suitable polyesters include in particular those that are typically used in the paint industry for example in powder coatings and include in particular the polyesters available under the URALAC brand from DSM in the Netherlands.

The aminoplasts for use in the primer layer are conveniently based on the condensation product of an aldehyde with an amino- or amido-group containing compound. While the aldehyde employed is most often formaldehyde, other aldehydes such as acetaldehyde, crotonaldehyde, acrolein, benzaldehyde, furfural, and glyoxal can also be used. Amine/amide containing compounds include those derived from at least one of glycoluril, aminotriazine, or benzoguanamine. Such compounds include, for example, alkoxyalkyl derivatives of melamine, glycoluril, benzoguanamine, acetoguanamine, formoguanamine, spiroguanamine, and the like. Condensation products obtained from the reaction of alcohols and formaldehyde with melamine, urea or benzoguanamine are most common and most suitable for use in the present invention. Condensation products of other amines and amides can also be employed, for example, aldehyde condensates of triazines, diazines, triazoles, guanadines, guanamines, and alkyl- and aryl-substituted derivatives of such compounds, including alkyl- and aryl-substituted ureas and alkyl- and aryl-substituted melamines. Some examples of such compounds are N,N'-dimethyl urea, benzourea, dicyandiamide, formaguanamine, acetoguanamine, glycoluril, ammeline, 2-chloro-4,6-diamino-1,3,5-triazine, 6-methyl-2,4-diamino-1,3,5-triazine, 3,5-diaminotriazole, triaminopyrimidine, 2-mercapto-4,6-diaminopyrimidine, and 3,4,6-tris(ethylamino)-1,3,5 triazine.

Aminoplast resins typically contain methylol or other alkylol groups and, in most instances, at least a portion of these alkylol groups are etherified by a reaction with an alcohol. Any monohydric alcohol can be employed for this purpose, including such alcohols as methanol, ethanol, propanol, butanol, pentanol, hexanol, cyclohexanol, heptanol, and others, as well as benzyl alcohol, and other aromatic alcohols, cyclic alcohols such as cyclohexanol, monoethers of glycols, and halogen-substituted or other substituted alcohols, such as 3-chloropropanol and butoxyethanol. Aminoplast resins that are substantially alkylated with methanol or butanol are particularly suitable for use herein.

Non limiting examples of suitable aminotriazine compounds suitable for use in the present invention include alkoxyalkyl aminotriazines, such as (methoxymethyl) melamine-formaldehyde resin, for example CYMEL 300, CYMEL 303, RESIMENE 745, RESIMENE 881, and RESIMENE 757; ethylated-methylated benzoguanamine-formaldehyde resin, for example CYMEL 1123; and methylated-butylated melamine-formaldehyde resin, for example CYMEL 1135, CYMEL 1133, and CYMEL 1168. These products are commercially available from either Cytec Industries, Inc. (CYMEL) or Solutia, Inc. (RESIMENE).

The weight ratio of polyester to aminoplast as used in the composition for preparing the primer layer is typically at least 2, for example at least 3. In a particular embodiment, the weight ratio of polyester to aminoplast is between 70 and 2, for example between 10 and 4 or between 3 and 16. Where the aminoplast and polyester react with one another and form a cure product, such reaction may be complete (i.e. there is substantially no starting material left) or may be a partial reaction leading to the primer layer comprising the reactants as well as cure product.

The thickness of the primer layer may vary widely but is typically at least 5 microns or is more than 10 microns. In a particular embodiment the thickness of the primer is between 5 and 50 microns. In a particular embodiment, the thickness of the primer layer is from 11 to 50 microns or from 15 to 40 microns.

As discussed above, desired coloring of the adhesive film may be achieved by including color pigments such as white pigments, black pigments and/or color pigments other than black and white. Additionally, where special effects are desired, the primer layer may include metallic pigments or other special effect (for example: pearlescent) pigments. Suitable pigments that may be added to the primer layer include those mentioned above in connection with the PVC film. Typically, the amount of pigments that may be included in the primer layer is at least 1 part by weight per 100 parts by weight of polyester and aminoplast. Generally, the total amount of pigments should not be more than 300 parts by weight of polyester and aminoplast. A typical amount of pigment is from 8 to 100 per 100 parts by weight of polyester and aminoplast.

The primer layer may include further optional components such as plasticizers and surfactant agents.

Adhesive Layer

In general the adhesive used in the adhesive layer is not particularly restricted. The thickness of the adhesive layer may vary widely. Typically, the adhesive layer will have a thickness of at least 10 micrometer, for example at least 15 micrometer or at least 20 micrometer. In a typical embodiment the thickness of the adhesive layer is from 15 micrometer to 50 micrometer. In a particular embodiment, the adhesive layer comprises a pressure sensitive adhesive (PSA). Pressure sensitive adhesives useful in the present invention can be self-tacky or require the addition of a tackifier. Particularly suitable adhesives for use in the present invention include pressure sensitive adhesives based on an acrylic polymer. Examples of adhesives include PSA's, hot melt or heat activated adhesives that are pressure sensitive at the time of application such as pressure sensitive adhesives disclosed in U.S. Pat. No. 4,994,322 (Delgado et al), U.S. Pat. No. 4,968,562 (Delgado), EP 0 570 515, and EP 0 617 708; and the pressure sensitive adhesives disclosed in U.S. Pat. Nos. 5,296,277 and 5,362,5165 (both Wilson et al) and U.S. Pat. No. 5,141,790 (Calhoun et al) and WO 96/1687 (Keller et al) and any other type of PSA disclosed in Handbook of Pressure-Sensitive Adhesives, Ed. D. Satas, 2.sup.nd Edition, Von Nostrand Reinhold, N.Y., 1989. Other examples of PSA's are, described in U.S. Pat. No. Re 24,906 (Ulrich), U.S. Pat. No. 4,833,179 (Young et al), U.S. Pat. No. 5,209,971 (Babu et al), U.S. Pat. No. 2,736,721 (Dester) and U.S. Pat. No. 5,461,134 (Leir et al) and in the Encyclopedia of Polymer Science and Engineering vol. 13, Wiley-Interscience Publishers, New York, 1988, and Encyclopedia of Polymer Sciences and Engineering, vol. 13, Wiley-Interscience Publishers, New York, 1964. Acrylate-based PSA's which include those described in U.S. Pat. No. 4,181,752 (Clemens et al) and U.S. Pat. No. 4,418,120 (Kealy et al), WO 95/13331 and in Handbook of Pressure-Sensitive Adhesives, Ed. D. Satas, 2.sup.nd Edition.

Particularly useful PSAs include acrylic polymers comprising repeating units of one or more alkyl (meth)acrylates of which the alkyl group has from 1 to 20 carbon atoms, for example 4 to 12 carbon atoms. Examples of alkyl (meth) acrylate monomers that may be used include isobornyl (meth)acrylate, ethyl(meth)acrylate, butyl(meth)acrylate, iso-octyl (meth)acrylate, 2-ethylhexyl (meth)acrylate and the like. The acrylic polymer may contain co-monomers including polar co-monomers such as ethylenically unsaturated acid monomers including for example (meth)acrylic acid and itaconic acid.

The adhesive layer should be removable i.e allow removal of the graphic film after use. For purposes of this invention, an adhesive is considered to be "removable", if after final application to an intended substrate the sheet material can be removed without damage to the substrate at the end of the intended life of the sheet material at a rate in excess of 25 feet/hour (7.62 meters/hour) by hand with the optional use of heat.

In a particular embodiment, the adhesive layer is a repositionable adhesive layer. For the purposes of this invention, "repositionable" refers to the ability to be, at least initially, repeatedly adhered to and removed from a substrate without substantial loss of adhesion capability. A repositionable adhesive usually has a peel strength, at least initially, to the substrate surface lower than that for a conventional aggressively tacky PSA. Suitable repositionable adhesives include the adhesive types used on CONTROLTAC Plus Film brand and on SCOTCHLITE Plus Sheeting brand, both made by 3M Company, St., Paul, Minn., USA.

In a particular embodiment, the adhesive layer in connection with the present invention is a topologically structured adhesive layer or an adhesive layer having at least one microstructured surface. In particular, the adhesive layer has a network of channels between the substrate surface on which the adhesive film is being applied and the adhesive layer. The presence of such channels allows air to pass laterally through the adhesive layer and thus allows air to escape from beneath the multi-layer sheet material and the surface substrate during application. The channels are typically produced in the adhesive layer through corresponding ridges of the release liner protecting the adhesive layer prior to application of the adhesive film. Accordingly, reference is made to the detailed description below regarding the release liner.

Release Liner

The adhesive layer is protected with a release liner. The release liner is preferably adhesive-repellant and more specifically comprises paper or film, which has been coated or modified with compounds of low surface energy relative to the adhesive applied. Organo silicone compounds, fluoropolymers, polyurethanes and polyolefins can serve this purpose. The release liner can also be a polymeric sheet produced from polyethylene, polypropylene, PVC, polyesters with or without the addition of adhesive-repellant compounds.

In a particular embodiment, the release liner has a microstructured or micro-embossed pattern. For example, the microstructure of the release liner (on its release side facing the adhesive layer) may have a series of ridges along at least two in-plane directions whereby the ridges are interconnected thereby defining a number of recesses enclosed by ridges. The ridges will typically have an average height of not more than 30 micrometer. Typically, the average height may be between 5 and 20 micrometer. The average distance between ridges along an in plane direction of the release liner may be between 50 and 400 micrometer when measured at the top. The geometry or shape of the ridges is not particularly critical and includes, in cross-section, curved, rectangular, trapezoidal, triangular, bimodal, and the like.

Figure 1:
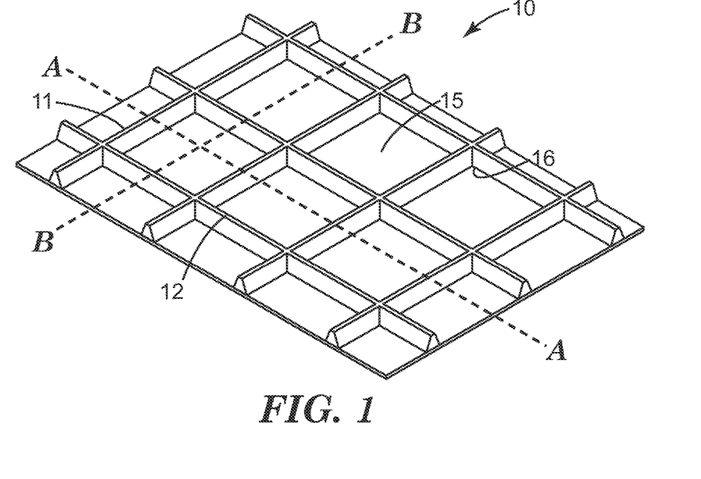
FIGS. 1 and 2 are schematic drawings of embodiments of an interconnected network of ridges on a surface of a release liner.

In a particular embodiment illustrated in FIG. 1, the release liner comprises ridges along two in-plane directions. FIG. 1 is a schematic drawing of an interconnected network of ridges on a surface of a release liner 10. A first series of ridges is formed by repeating ridges 11 along in-plane direction A and a second series of ridges formed by repeating ridges 12 along direction B. The ridges connect to each other at intersections 16 thereby defining a pattern of enclosed recesses 15. As shown in FIG. 1, the enclosed recesses have the shape of a rectangular or square. Alternative shapes of the recesses are contemplated as well and may be formed by additional series of ridges.

Figure 2:
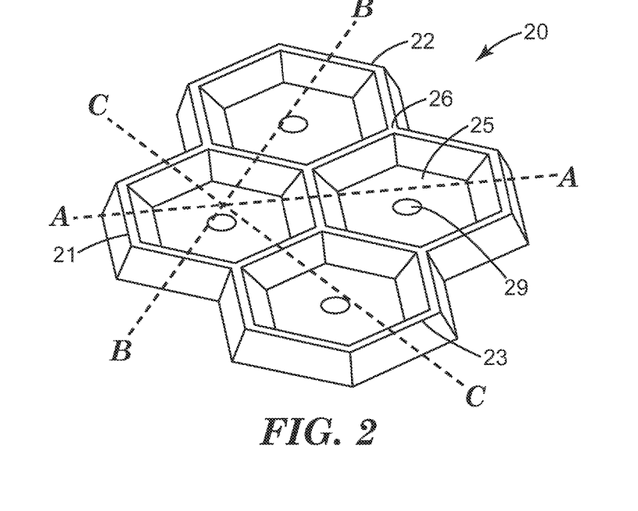

For example, FIG. 2 shows a schematic drawing of an interconnected network of ridges on a surface of a release liner 20. A series of ridges 21, 22 and 23 along respectively in-plane directions A, B and C result in ridges interconnecting at intersections 26 thereby defining a pattern of hexagonal shaped recesses 25.

In a particular embodiment the microstructure formed by the ridges on the surface of the release liner may be superimposed with a further pattern defined by discrete small depressions within the recesses defined by the interconnecting ridges. This is illustrated in FIG. 2 by numerals 29 within the recesses 25.

The microstructure of the release liner may be formed by any suitable means including in particular by embossing the liner with an appropriate tool. Methods for producing release liners with a desired microstructure as described herein can be found in for example EP 951 518 and US 2008/0299346.

Optional Further Layers

The adhesive film may in certain embodiments contain additional layers. For example in a particular embodiment a further clear transparent top layer may be provided on the side of the PVC film opposite to the major side having the adhesive layer. Such a top layer may serve to enhance weatherability of the adhesive film, particularly where the film is applied horizontally such as on hood of a car. Further, a top layer may protect the adhesive film when wound on itself in a big jumbo roll. A suitable top layer may be applied by any common application method including coating, screen printing and the like. Typically, the top layer will include a polymer resin. Suitable resins include PVC, acrylic polymers and polyester such as polyethylene terephthalate and combinations thereof. The thickness of a top layer may vary widely but is typically at least 0.5 microns. In a particular embodiment, the thickness is from 1 to 50 microns.

Method of Making

The adhesive film is typically made using a method comprising (i) applying on a carrier web in the order given: the optional top layer, the PVC layer, primer layer, adhesive layer and a release liner and (ii) removing the carrier web. The carrier web is typically selected so as to obtain the desired finish of the adhesive film such as a gloss or mat finish. Two or more layers of the adhesive film may be provided in one application step and/or individual layers of the adhesive film may be applied in separate application steps. The carrier web used in the manufacturing method includes typically a paper or film backing provided with a release coating enabling stripping and removing of the carrier web typically when all layers have been applied. Suitable release coatings on the carrier web include in particular thermoset urea resins and acrylic resins.

When present, the optional top layer may be coated on the carrier web. Typically, the top layer is provided from a solution of the constituting components of the top layer in an organic solvent on the carrier. In a particular embodiment, the top layer may be provided on the carrier web in an application step jointly with the release coating of the carrier web.

The PVC layer is typically applied to the carrier web (or the optional top layer) from a PVC organosol composition. Typically, the PVC organosol composition will include a PVC, plasticizers and further optional components in a suitable solvent. Typical solvents that may be used include commercially available solvents such as Solvesso, butylglycol, Terapin (mixture of aliphatic, aromatic and naphthenic hydrocarbons), xylene and ethylacetate. Generally, following application of the PVC organosol, the applied PVC layer is heated. Generally, the layer is heated to a temperature of between 185° C. and 210° C. for a period of 30 seconds to 240 seconds. On the PVC layer is then typically applied the primer layer from a composition comprising the aminoplast and polyester as well as further components such as pigments in an organic solvent.

The components of the primer layer may be dispersed or dissolved in organic solvents such as butylglycol. The applied primer layer is typically heated. Generally, the primer layer may be heated to a temperature of at least 140° C. or between 160° C. and 215° C. Typically, the layer will be heated for a time between 30 seconds and 120 seconds.

The adhesive layer and release liner may be applied to the primer layer in a number of different ways. In one particular embodiment, the adhesive layer may be coated on the primer layer and the release liner with the desired microstructure as described above may be laminated thereto. In another embodiment, the adhesive layer may be coated on the release liner with the desired microstructure and then this laminate may be laminated onto the primer layer.

Method of Use

The adhesive film as described above is typically used to produce a graphic on a substrate. The graphic may be an image graphic or a text message or a combination thereof. The graphic may have any size but the adhesive films in connection with this invention are particularly suitable for producing large size graphics for example extending over an area of at least 1 m² or at least 2 m². The adhesive film is particularly suitable for application on a substrate with an uneven surface. Generally, the adhesive film will then be conforming to the uneven surface of the substrate. Examples of uneven surfaces include substrates that have recesses, rivets, or areas of curvature. The adhesive film may be applied to a large variety of substrates. Typical applications include applying the film onto building (exterior or interior) as well as on vehicles including in particular motor vehicles such as trains, busses, trams, cars, vans, trucks as well as airplanes.

In connection with this invention, the method of producing a graphic comprises producing a graphic having a plurality of discrete units of colored adhesive film. In this method, the colored adhesive film of each of the discrete units comprises the adhesive film. The method in this embodiment comprises:
  (i) providing a colored graphics film comprising the adhesive film;
  (ii) cutting the polyvinyl chloride film, the primer layer and the adhesive layer of the adhesive film to define therein the plurality of discrete units,
  (iii) delaminating or weeding the cut polyvinyl chloride film, the primer layer and the adhesive layer from the release liner of the adhesive film so as to leave the plurality of discrete units on the release liner;
  (iv) applying an adhesive application tape over the plurality of discrete units;
  (v) removing the release liner thereby leaving the plurality of discrete units attached to the adhesive application tape
  (vi) applying the adhesive application tape with the plurality of discrete units to the substrate on which a graphic is desired so as to sandwich the plurality of discrete units between the surface of the substrate and the adhesive application tape; and removing the application tape.

Application tapes for use in this method of this embodiment include any of the application tapes typically used in applying prespaced graphics to substrates. The discrete units of colored adhesive film are obtained by cutting the adhesive film. Any cutting tool can be used including hand tools however, typically a so-called electro cutter will be used. Examples of electro cutters include a sprocket fed/pin fed cutter, a friction bed cutter or a flatbed cutter.

EXAMPLES

The following examples are provided to further illustrate the compositions and methods provided herein. These examples are provided to illustrate certain embodiments but are not meant to limit the invention thereto. Prior to that some test methods used to characterize materials and their properties will be described. Unless specified otherwise, percentages are percentages by weight with respect to the mass of the total compositions and add up in each case to 100 weight percent. Parts are parts by weight.

Test Methods

A. Preparation of Test Panels

Figure 3:
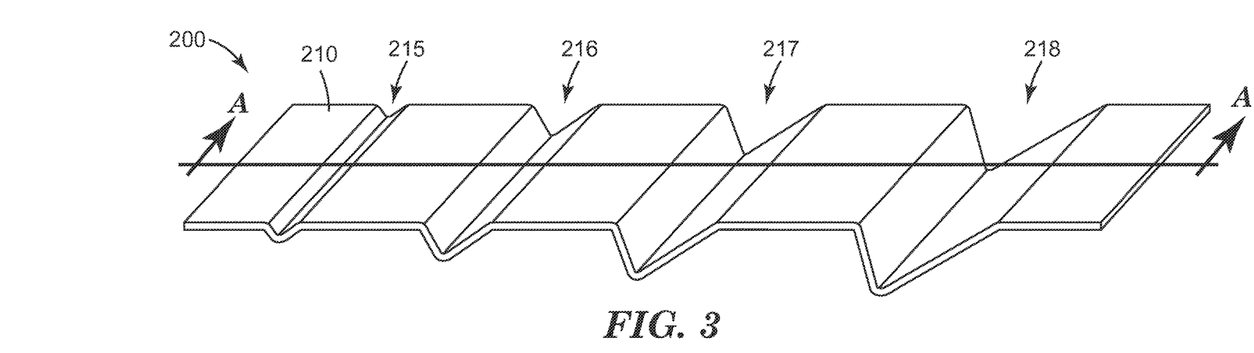
FIGS. 3 and 3A are schematic drawings of a test panel used in connection with a lifting test as set out in the examples.
Figure 3A:
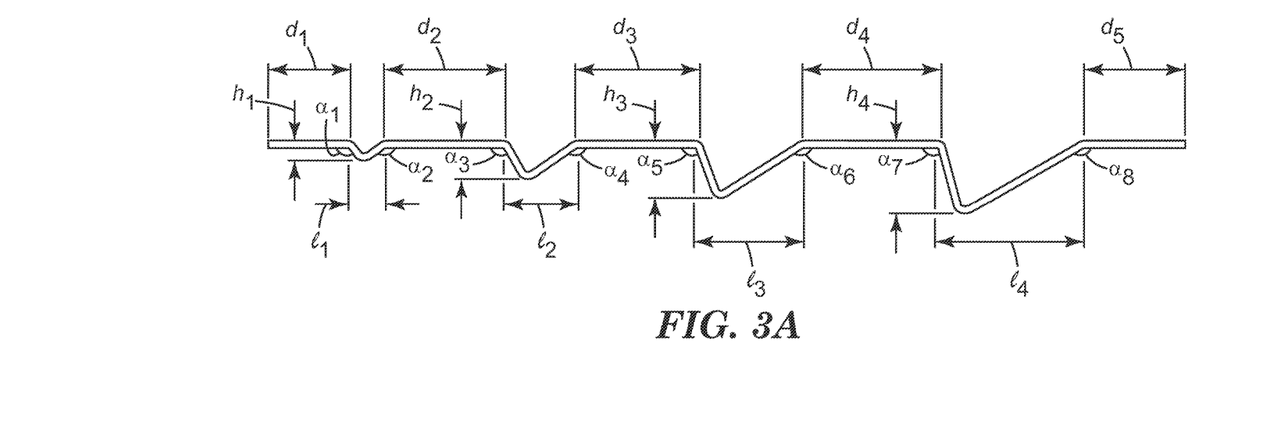

FIG. 3 represents a schematic drawing of a test panel (200), however not representing real measurements. The dimensions are given below. The test panel (200) is formed from an aluminum sheet (210) having a thickness of 1 mm that was bent to have a pattern of four successively deeper V-shaped grooves (215 to 218), each having different angles forming the V-shape and having different depths and length extensions.

After bending, the test panel has a dimension of 28 cm×8.5 cm.

From the left to the right, the test panels have four grooves (215 to 218). Groove (215) has a depth ($h_1$) of 0.5 cm and a length extension ($l_1$) of 1.0 cm. The groove angles relative to the sheet metal plane are (left/right) α1=128° and α2=148°. Groove (216) has a depth (h$_2$) of 1.0 cm and a length extension (l$_2$) of 2.0 cm. The groove angles relative to the sheet metal plane are (left/right) α3=118° and α4=147°. Groove (217) has a depth (h$_3$) of 1.5 cm and a length extension (l$_3$) of 3.0 cm. The groove angles relative to the sheet metal plane are (left/right) α5=108° and α6=149°. Groove (218) has a depth (h$_4$) of 2.0 cm deep and a length extension (l$_4$) of 4.0 cm. The groove angles relative to the sheet metal plane are (left/right) α7=105° and α8=150°. All grooves extend entirely over the width of the metal sheet, i.e. have a width extension of 8.5 cm. The length extensions d$_1$, d$_2$, d$_3$ and d$_5$ are 3.5 cm. The length extension d$_4$ is 4.0 cm.

Untreated aluminum test panels were used and referred to in the examples as "Alu substrate". Some of the Al test panels were painted with a standard automotive paint used in the automotive industry and finally painted with a two-component Cerami Clear (CC) paint available from PPG, Pittsburgh, Pa., USA. After painting, the test panels were left at RT during 24 hours. The painted test panels are referred to in the examples as "CC substrate".

B. Application of Adhesive Film on Test Panels

A strip of adhesive film (4 cm×30 cm) was applied on the test panel, using a squeegee, so the film was bridging the V-shaped grooves. A second strip of adhesive film (4 cm×30 cm) was applied on the test panel, in the same way and providing an overlap of minimum 3 mm with the first adhesive film strip. The strips were heated at 50° C. with a hot air gun and pressed in the grooves by means of a roll. The adhesive film strips were then heated with the hot air gun until the substrate temperature reached 80° C. to 100° C. (measured with an infra red thermometer). After heating, the adhesive film strips were pressed into the grooves again using a small roll. The coated test panels were left at room temperature during 24 hours before heat treatment.

C. Tensile Strength, Elongation and E-Modulus

The adhesive films (without release liner) were evaluated for their tensile strength, elongation and E-Modulus using a Zwick tester (available from Zwick, UK).

Tensile and elongation tests were run with a 100 N load cell at a constant cross head displacement rate of 300 mm/min (gauge length 100 mm; width of sample: 25.4 mm). The E-modulus was measured with a 0.5 N load cell, at a displacement rate of 5 mm/min and an elongation (1) of 0.5% and elongation (2) of 1%.

Each test was run 24 times. The values reported are the averages of the 24 tests. Elongation at Break is reported in %, Tensile Strength at Break and E-Modulus are reported in N/mm$^2$.

D. Lifting and Removability of Adhesive Film

The coated test panels were first visually evaluated. Then the test panels were heated in an oven at 70° C. during 7 days after which the panels were cooled to room temperature and visually evaluated again. Visual evaluation was done according to the following rating:

| Rating | Visual evaluation |
|---|---|
| 1 | No lifting at all |
| 2 | No lifting, but not perfect |
| 3 | Minimal lifting, acceptable |
| 4 | Visible lifting, adhesive remains on film |
| 5 | Visible lifting, adhesive residue on panel |
| 6 | Visible lifting, primer residue on panel |
| 7 | Visible lifting, adhesive split |

After heat aging, the test panels were cooled to room temperature and the adhesive film was manually removed at an angle of 45°. When the film could not be removed at room temperature, the substrate was heated to 40 or 60° C., until the film could be removed. The temperature needed to remove the film is indicated in the examples.

Materials Used and Abbreviations:

| Abbreviation | Composition | Availability |
|---|---|---|
| TiO2 | titanium dioxide pigment | DuPont |
| URALAC | Urethane modified polyester resin, 45% solids in naphtha solvent | DSM Coating Resins |
| RESIMENE | butylated melamine-formaldehyde resin 60% solids | Monsanto |

Sample Preparation for Examples A

A. Preparation of White Primer Mixture

White primer mixture was prepared by blending the ingredients in amounts as given in table 1. The amounts refer to the actual commercial composition, not to solids. The white primer mixture was made by first blending URALAC with TiO$_2$, then adding butylglycol and finally adding RESIMENE and the polymeric plasticizer. In between the additions, the mixtures were stirred during 5-10 min at 300-800 rpm.

TABLE 1

| | White primer mixture | |
|---|---|---|
| Ingredient | Parts | % by weight |
| URALAC | 85 | 55.2 |
| RESIMENE | 10 | 6.5 |
| Carbon black | 0 | 0 |
| TiO2 | 44 | 28.6 |
| BUTYLGLYCOL | 7 | 4.5 |
| Polymeric plasticizer (Mw 4500) | 8 | 5.2 |

B. Method of Making Adhesive Film

Adhesive films were prepared according to the general procedure outlined below.

In a first step, plasticized PVC organosol containing white pigment was casted on a polyester- or paper based presize carrier web comprising a layer of thermoset alkyd urea resin. The coating was dried in a forced air oven at 80° C. for 45 second and fused at 195° C. for 60 seconds. The coating thickness of the white PVC layer after drying and fusing was approximately 50 µm. The white primer mixture was casted on top of the dried PVC film. The coating was dried in a forced air oven at 185° C. for 45 seconds. The coating thickness of the dried primer layer was approximately 30 µm.

Finally, an acrylic pressure sensitive adhesive as used on commercial graphics film SCOTCHCAL 3650, available from 3M company, coated on a microstructured release liner (as used in IJ40C, available from 3M company) was laminated against the primer layer, using a lab laminator. The coating thickness of the adhesive was 35 µm. In a final step, the carrier web was removed.

Example A-1

Discrete units in the form of letter, signs and strips were cut in the adhesive film prepared as given above, using a Zünd M800 flad bed plotter (available from Zünd) with a tracing cutting head, and applying a pressure of 140 g. In order to ensure that the film was cut completely through the adhesive, but not through the release liner, the depth was selected such that the release liner was lightly scored.

After the cutting, the unwanted parts of the film were removed (weeding), thereby leaving the discrete units on the release liner. Before weeding, the units were inspected to determine which side had the most open cuts and weeding then started from that side. Next, an application tape was applied over the discrete units. Then the release liner was removed, leaving the discrete units onto the application tape. The units were inspected visually. No defects were observed. In order to evaluate the performance of the adhesive film units, the strips were applied onto untreated aluminium test panels (Alu substrate) and on aluminium test panels coated with the CeramiClear paint (CC substrate) according to the general procedure outlined above. No lifting was observed after 24 hrs at RT or after 7 days heating at 70° C. The strips could be removed from untreated aluminium panels (Alu substrate) without residue at a temperature of 40° C.

Sample Preparation for Examples B

A. Preparation of Primer Mixtures

The mixtures were prepared by blending the ingredients in amounts as given in the tables below. The amounts refer to the actual commercial composition, not to solids.

1. Black and White Primer Mixtures

Black and white primer mixtures were prepared by blending the ingredients in amounts as given in table 2. For the black primer mixture, the mixture was stirred at 500-800 rpm during 15 min at room temperature. White primer mixtures were made by first blending URALAC with $TiO_2$, then adding butylglycol and finally adding RESIMENE and the polymeric plasticizer. In between the additions, the mixtures were stirred during 5-10 min at 300-800 rpm.

TABLE 2

| Ingredient | Black primer mixture | | White primer mixture | |
| --- | --- | --- | --- | --- |
| | Parts | % by weight | Parts | % by weight |
| URALAC | 85 | 76.6 | 85 | 55.2 |
| RESIMENE | 10 | 9.0 | 10 | 6.5 |
| Carbon black | 8 | 7.2 | 0 | 0 |
| TiO2 | 0 | 0 | 44 | 28.6 |
| BUTYLGLYCOL | 0 | 0 | 7 | 4.5 |
| Polymeric plasticizer (Mw 4500) | 8 | 7.2 | 8 | 5.2 |

2. Silver Metallic Primer Mixtures

Silver metallic primer mixtures were prepared by mixing the ingredients as listed in table 3. The mixtures were stirred at 800 rpm during 15 min at room temperature.

TABLE 3

| Ingredient | Parts | % by weight |
| --- | --- | --- |
| URALAC | 68 | 74.0 |
| RESIMENE | 8 | 8.7 |
| Aluminum flake paste | 8 | 8.7 |
| Naphtha solvent | 8 | 8.7 |

C. Method of Making Adhesive Film

Adhesive films were prepared according to the general procedure outlined below.

In a first step, plasticized PVC organosol was casted on a polyester- or paper based presize carrier web comprising a layer of thermoset alkyd urea resin. The coating was dried in a forced air oven at 80° C. for 45 second and fused at 195° C. for 60 seconds. The coating thickness of the PVC layer after drying and fusing was approximately 50 µm. A black or white primer mixture was casted on top of the dried PVC film. The coating was dried in a forced air oven at 185° C. for 45 seconds. The coating thickness of the dried primer layer was approximately 30 µm.

Finally, an acrylic pressure sensitive adhesive as used on commercial graphics film SCOTCHCAL 3650, available from 3M company, coated on a microstructured release liner (as used in IJ40C, available from 3M company) was laminated against the primer layer, using a lab laminator. The coating thickness of the adhesive was 35 µm. In a final step, the carrier web was removed.

In order to produce a black adhesive film, a plasticized PVC organosol containing black pigment was used in combination with a black primer mixture. A white adhesive film was made with plasticized PVC organosol containing white pigment in combination with a white primer layer. Silver metallic adhesive films were made with clear plasticized PVC organosol in combination with a silver metallic primer layer.

Examples B-1 to B-3 and Comparative Example Comp-1

In examples B-1 to B-3, respectively white, silver metallic and black adhesive films were prepared according to the general method outlined above. Comparative example Comp-1 was made in the same way but without the primer layer. The thickness of the PVC layer of Comp-1 was 80 µm. The properties of the adhesive films were evaluated and the test results are given in table 4. The adhesive films were applied onto untreated aluminium test panels (Alu substrate) and on aluminium test panels coated with the Cerami Clear paint (CC substrate) according to the general procedure outlined above. Lifting was evaluated on both substrates. Removal was evaluated on the Alu substrates. The results are given in table 5.

TABLE 4

| Ex | Tensile strength (N/mm$^2$) | Elongation (%) | E-Modulus (N/mm$^2$) |
| --- | --- | --- | --- |
| B-1 | 13.59 | 142.78 | 241.17 |
| B-2 | 13.87 | 191.61 | 93.57 |
| B-3 | 18.19 | 202.39 | 419.75 |

TABLE 5

| Ex | Substrate | Lifting (24 hrs RT) | Lifting (7 days 70° C.) | Temp for clean removal (° C.) |
| --- | --- | --- | --- | --- |
| B-1 | CC | 1 | 1 | ND |
| | Alu | 1 | 1 | 40 |
| B-2 | CC | 1 | 1 | ND |
| | Alu | 1 | 1 | 40 |
| B-3 | CC | 1 | 1 | ND |
| | Alu | 1 | 1 | 40 |
| Comp-1 | CC | 1 | 4* | ND |
| | Alu | 1 | 1 | 22** |

Notes:
4*: rating 4 applied to all 4 grooves
22**: no clean removal, some adhesive residue on panel
ND = not determined Sample Preparation for Examples C A. Preparation of White Primer Mixture White primer mixture was prepared by blending the ingredients in amounts as given in the table 6. The amounts refer to the actual commercial composition, not to solids. White primer mixture was made by first blending URALAC with $TiO_2$, then adding butylglycol and finally adding RESIMENE and the polymeric plasticizer. In between the additions, the mixtures were stirred during 5-10 min at 300-800 rpm.

TABLE 6

| Ingredient | White primer mixture | |
|---|---|---|
|  | Parts | % by weight |
| URALAC | 85 | 55.2 |
| RESIMENE | 10 | 6.5 |
| TiO2 | 44 | 28.6 |
| BUTYLGLYCOL | 7 | 4.5 |
| Polymeric plasticizer (Mw 4500) | 8 | 5.2 |

B. Method of Making Colored Adhesive Film

Adhesive films were prepared according to the general procedure outlined below.

In a first step, transparent plasticized PVC organosol was casted on a polyester- or paper based presize carrier web comprising a layer of thermoset alkyd urea resin. The coating was dried in a forced air oven at 80° C. for 45 second and fused at 195° C. for 60 seconds. The coating thickness of the transparent PVC top layer after drying and fusing was approximately 10 µm. Then a colored plasticized PVC organosol was casted on the transparent PVC layer. The coating was dried in a forced air oven at 80° C. for 45 second and fused at 195° C. for 60 seconds. The coating thickness of the PVC layer after drying and fusing was approximately 50 µm. A white primer mixture was casted on top of the colored PVC layer. The coating was dried in a forced air oven at 185° C. for 45 seconds. The coating thickness of the dried primer layer was approximately 30 µm.

Finally, an acrylic pressure sensitive adhesive as used on commercial graphics film SCOTCHCAL 3650, available from 3M company, coated on a microstructured release liner (as used in IJ40C, available from 3M company) was laminated against the primer layer, using a lab laminator. The coating thickness of the adhesive was 35 µm. In a final step, the carrier web was removed.

Examples C-1 and C-2

In examples C-1 and C-2, yellow and red colored adhesive films were prepared according to the general method outlined above. Example C-1 was made with yellow plasticized PVC organosol and example C-2 was made with red plasticized PVC organosol.

The properties of the adhesive films were evaluated. The test results are given in table 7. The adhesive films were applied onto untreated aluminium test panels (Alu substrate) and on aluminium test panels coated with the Cerami Clear paint (CC substrate) according to the general procedure outlined above. Lifting was evaluated on both substrates. No lifting was observed after 24 hrs at RT or after 7 days heating at 70° C. Removal was evaluated on untreated aluminium panels (Alu substrate). The strips could be removed from the Alu substrates without residue at a temperature of 40° C.

TABLE 7

| Ex | Tensile strength (N/mm$^2$) | Elongation (%) | E-Modulus (N/mm$^2$) |
|---|---|---|---|
| Ex 1 | 16.31 | 192.03 | 174.08 |
| Ex 2 | 15.27 | 199.83 | 158.72 |

The invention claimed is:

1. A conformable adhesive film comprising:
   a polyvinyl chloride film having opposite first and second major sides when in a flat position, the first major side having an adhesive layer protected by a release liner and a primer layer arranged between the polyvinyl chloride film and the adhesive layer, the primer layer comprising an aminoplast and a urethane extended polyester and/or a curing product thereof, and the adhesive layer being at least one of topologically structured or having at least one microstructured surface;
   wherein the conformable adhesive film adheres to uneven or complex-shaped painted surfaces without lifting or popping-up from the surface when heated at a temperature of 70 degrees Celsius for seven days.

2. The adhesive film according to claim 1, wherein the polyvinyl chloride film is colored.

3. The adhesive film according to claim 1, wherein the adhesive film has a thickness of more than 10 microns.

4. The adhesive film according to claim 1 wherein the aminoplast in the primer layer is an alkylated melamine formaldehyde resin.

5. The adhesive film according to claim 4 wherein the aminoplast is an n-butylated melamine formaldehyde resin.

6. The adhesive film according to claim 1 wherein the weight ratio of polyester to aminoplast in the primer layer is between 70 and 2.2.

7. The adhesive film according to claim 1 wherein the primer layer further comprises one or more white pigments.

8. The adhesive film according to claim 1 wherein the polyvinyl chloride film comprises one or more color pigments and has a color other than white or black.

9. The adhesive film according to claim 1 wherein the polyvinyl chloride film has a thickness of 25 to 100 micrometer.

10. The adhesive film according to claim 1 wherein the second major side has a clear transparent top layer comprising polyvinyl chloride.

11. The adhesive film according to claim 10 wherein the top layer has a thickness of 1 to 50 micrometer.

12. The adhesive film according to claim 1 wherein the release liner comprises on the major surface contacting the adhesive layer a series of ridges along at least two in-plane directions whereby the ridges are interconnected thereby defining a number of recesses enclosed by ridges.

13. The adhesive film according to claim 12, wherein the ridges have an average height of not more than 30 microns.

14. Method for producing a graphic on a substrate, the method comprising
   providing an adhesive film as defined in claim 1,
   removing the release liner,
   applying the adhesive film on the substrate.

15. The method according to claim 14 wherein the substrate comprises an uneven surface and wherein the adhesive film is applied over the uneven surface conforming thereto.

16. The method according to claim 14 wherein the substrate comprises a vehicle.

17. The method according to claim 16 wherein the vehicle is a car, a bus, a tram, a train or an airplane.

18. A method of making a decoration comprising a plurality of discrete units of the adhesive film according to claim 1, the method comprising:
providing a colored graphics film comprising a polyvinyl chloride film comprising on a major side thereof said adhesive layer and said primer layer arranged between said adhesive layer and the polyvinylchloride film, the adhesive layer being protected by a release liner;
cutting the polyvinyl chloride film, the primer layer and the adhesive layer of the colored graphics film to define therein said plurality of discrete units,
delaminating the cut polyvinyl chloride film, the primer layer and the adhesive layer from the release liner of said colored graphics film so as to leave the plurality of discrete units on said release liner;
applying an adhesive application tape over the said plurality of discrete units;
removing the release liner thereby leaving the plurality of discrete units attached to the adhesive application tape
applying the adhesive application tape with the plurality of discrete units to a surface to be decorated so as to sandwich the plurality of discrete units between the surface and the adhesive application tape; and
removing the application tape.

19. The method according to claim 18 wherein the surface to be decorated is uneven and wherein the colored adhesive film is applied over the uneven surface conforming thereto.

20. The method according to claim 18 wherein the surface to be decorated is the surface of a vehicle.

21. The method according to claim 20 wherein the vehicle is a motor vehicle.

22. The method according to claim 20 wherein the vehicle is a car, a bus, a train, a tram or an airplane.

23. The method according to claim 18 wherein the polyvinyl chloride film is colored and/or the primer layer is colored.

24. A method for making an adhesive film suitable for use in a method as defined in claim 1, the method comprising (i) applying on a carrier web in the order given: the polyvinyl chloride film layer, primer layer, adhesive layer and release liner and (ii) removing the carrier web.

25. The method according to claim 24 wherein the carrier web comprises a release layer and the polyvinyl chloride film layer is applied thereto by applying a polyvinyl chloride organosol composition, heating and drying the applied organosol.

26. The method according to claim 24, wherein the primer layer is applied by applying on the polyvinyl chloride film a composition comprising an aminoplast and a polyester, heating and drying the applied composition.

27. The method according to claim 24, wherein the adhesive layer and release liner are applied by laminating a laminate of adhesive layer and release liner to the primer layer.

* * * * *